(12) United States Patent
Sharma et al.

(10) Patent No.: US 7,954,092 B2
(45) Date of Patent: May 31, 2011

(54) CREATING AN ASSURED EXECUTION ENVIRONMENT FOR AT LEAST ONE COMPUTER PROGRAM EXECUTABLE ON A COMPUTER SYSTEM

(75) Inventors: Anurag Sharma, Mountain View, CA (US); Amit Singh, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1307 days.

(21) Appl. No.: 11/318,192

(22) Filed: Dec. 24, 2005

(65) Prior Publication Data

US 2007/0150874 A1     Jun. 28, 2007

(51) Int. Cl.
*G06F 9/45* (2006.01)

(52) U.S. Cl. ....................................................... 717/136
(58) Field of Classification Search .................... 717/136
See application file for complete search history.

(56) References Cited

U.S. PATENT DOCUMENTS

| | | | |
|---|---|---|---|
| 5,596,718 A * | 1/1997 | Boebert et al. .................. 726/16 |
| 5,794,234 A | 8/1998 | Church et al. | |
| 6,035,120 A | 3/2000 | Ravichandran | |
| 6,067,639 A * | 5/2000 | Rodrigues et al. .............. 714/38 |
| 6,085,203 A | 7/2000 | Ahlers et al. | |
| 6,425,118 B1 | 7/2002 | Molloy et al. | |
| 6,484,309 B2 | 11/2002 | Nowlin, Jr. et al. | |
| 6,542,845 B1 * | 4/2003 | Grucci et al. .................. 702/122 |
| 6,957,186 B1 * | 10/2005 | Guheen et al. ................ 705/323 |
| 7,346,580 B2 * | 3/2008 | Lisanke et al. .................. 705/50 |
| 7,475,250 B2 * | 1/2009 | Aull et al. ...................... 713/173 |
| 7,502,939 B2 * | 3/2009 | Radatti ......................... 713/188 |
| 7,590,863 B2 * | 9/2009 | Lambert ....................... 713/189 |
| 2002/0112183 A1 * | 8/2002 | Baird et al. .................... 713/201 |
| 2005/0086499 A1 * | 4/2005 | Hoefelmeyer et al. ....... 713/188 |
| 2005/0138423 A1 | 6/2005 | Ranganathan | |
| 2005/0138606 A1 | 6/2005 | Basu et al. | |
| 2007/0078775 A1 * | 4/2007 | Huapaya et al. ................ 705/59 |

\* cited by examiner

*Primary Examiner* — John Chavis
(74) *Attorney, Agent, or Firm* — Leonard T. Guzman; Mohammed Kashef

(57) ABSTRACT

The present invention provides processor-implemented method and system of creating an assured execution environment for at least one computer program executable on a computer system. In an exemplary embodiment, the method and system include (1) converting the executable into a computer program targeted for the computer system, where the converting includes scrambling the executable by applying an encryption scheme to the executable and (2) executing the program on the computer system only if the program complies with a policy.

24 Claims, 17 Drawing Sheets

CREATING AN ASSURED EXECUTION ENVIRONMENT FOR AT LEAST ONE COMPUTER PROGRAM EXECUTABLE ON A COMPUTER SYSTEM

FIELD OF THE INVENTION

The present invention relates to computer operating systems and to the security of computer systems, and particularly relates to a method and system of creating an assured execution environment for at least one computer program executable on a computer system.

BACKGROUND OF THE INVENTION

Running computer programs on a computer system poses challenges. For example, a rogue computer program could execute on the computer system, could at the very least create an annoyance, and could at the very worst cause irreparable damage to the computer system. In addition, a pirated computer program could be executed on the computer system. Also, a computer program may be used on the computer program illegally, perhaps by accident. It is also difficult to ensure that a "value-add" (or deployed) computer program only executes on an intended, or targeted, computer system. A computer program includes at least one computer program executable, which can be run on a computer system.

Need for Assured Execution Environment

Such problems are more acute, and more useful to solve, for a computer program that is "managed", typically by an information technology (IT) organization. Such computer program management is de-facto in the Enterprise, where users hardly install and maintain all their own computer programs. In such scenarios, asset management and license tracking for the computer programs are cumbersome, complicated, and bothersome to the user. Moreover, policy compliance verification or enforcement is explicit (e.g., an agent must proactively check for compliance).

Computer program executables (including malware) are generated with respect to an Application Binary Interface (ABI), which provides low-level uniformity across computer systems of that type. Thus, malware (e.g., a computer virus, computer worm, a computer Trojan horse) knows the software/hardware architecture on which it would be executing. An "alien" computer program executable must be in a format, and must conform to the ABI, that is understood by the operating system of the computer system. Thus, malware from one type of computer system (platform) does not typically affect another platform. Malware expects a certain runtime environment. Conversely, in order for the operating system of a computer system to run a computer program executable, the executable must conform to the ABI that the computer system and that the operating system supports. In particular, if the executable is "garbage" (i.e., the executable does not conform to the ABI) from the standpoint of the operating system or the computer system, it will not run on the computer system.

Prior Art Defense Systems

As shown in prior art FIG. 1, a typical prior art defense system attempts to defeat malware on a computer system by (1) detecting the malware and (2) preventing malicious operations that the malware tries to perform. Such a prior art system may detect the malware by (a) recognizing malware signatures, deterministically or heuristically, (b) analyzing the behavior of the malware, or (c) running the malware in a "sandbox". A "sandbox" is a segregated part of a computer system in which an executable can run with a low probability of the executable damaging the computer system. Unfortunately, such techniques have become overly complex today, and none are sufficient. Therefore, a method and system of creating an assured execution environment for at least one computer program executable on a computer system is needed.

SUMMARY OF THE INVENTION

The present invention provides a method and system of creating an assured execution environment (AxE) for at least one computer program executable on a computer system. In an exemplary embodiment, the method and system include (1) converting the executable into a computer program targeted for the computer system and (2) providing the environment in which the program can be accessed on the computer system.

In an exemplary embodiment, the converting includes scrambling the executable. In a specific embodiment the scrambling includes applying a software encryption scheme to the executable. In a specific embodiment the scrambling includes applying a hardware-assisted encryption scheme to the executable. In a specific embodiment the scrambling includes applying a hardware encryption scheme to the executable. In an exemplary embodiment, the converting includes attaching filesystem metadata to the executable.

In an exemplary embodiment, the providing includes executing the program on the computer system only if the program complies with a policy. In an exemplary embodiment, the executing includes, if the program is scrambled and includes filesystem metadata, descrambling the program in accordance with the policy. In a specific embodiment, the descrambling includes (a) verifying the integrity of the program with respect to the computer system, (b) if the integrity of the program with respect to the computer system is verified, descrambling the program, and (c) if the program is descrambled, running the program on the computer system.

In an exemplary embodiment, the executing includes, if the program is not scrambled and includes filesystem metadata, running the program on the computer system in accordance with the policy. In an exemplary embodiment, the executing includes, if the program is not scrambled and does not include filesystem metadata, denying the execution of the program on the computer system in accordance with the policy.

In an exemplary embodiment, the providing includes preventing malicious code from executing on the computer system before the environment is loaded on the computer system. In a specific embodiment, the preventing includes denying a HKLM registry hive modification request on the computer system. In a specific embodiment, the preventing includes denying a write to a /System/Library/Extensions folder on the computer system.

In an exemplary embodiment, the providing includes reading the program from the computer system only if the program complies with a policy. In an exemplary embodiment, the providing includes writing to the program on the computer system only if the program complies with a policy.

The present invention also provides a computer program product usable with a programmable computer having readable program code embodied therein of creating an assured execution environment for at least one computer program executable on a computer system. In an exemplary embodiment, the computer program product includes (1) computer readable code for converting the executable into a computer program targeted for the computer system and (2) computer readable code for providing the environment in which the program can be accessed on the computer system.

The present invention also provides a method of providing a service to create an assured execution environment for at least one computer program executable on a computer system. In an exemplary embodiment, the method includes (1) converting the executable into a computer program targeted for the computer system and (2) providing the environment in which the program can be accessed on the computer system.

THE FIGURES

DETAILED DESCRIPTION OF THE INVENTION

The present invention provides a method and system of creating an assured execution environment (AxE) for at least one computer program executable on a computer system. In an exemplary embodiment, the method and system include (1) converting the executable into a computer program targeted for the computer system and (2) providing the environment in which the program can be accessed on the computer system.

Figure 1:
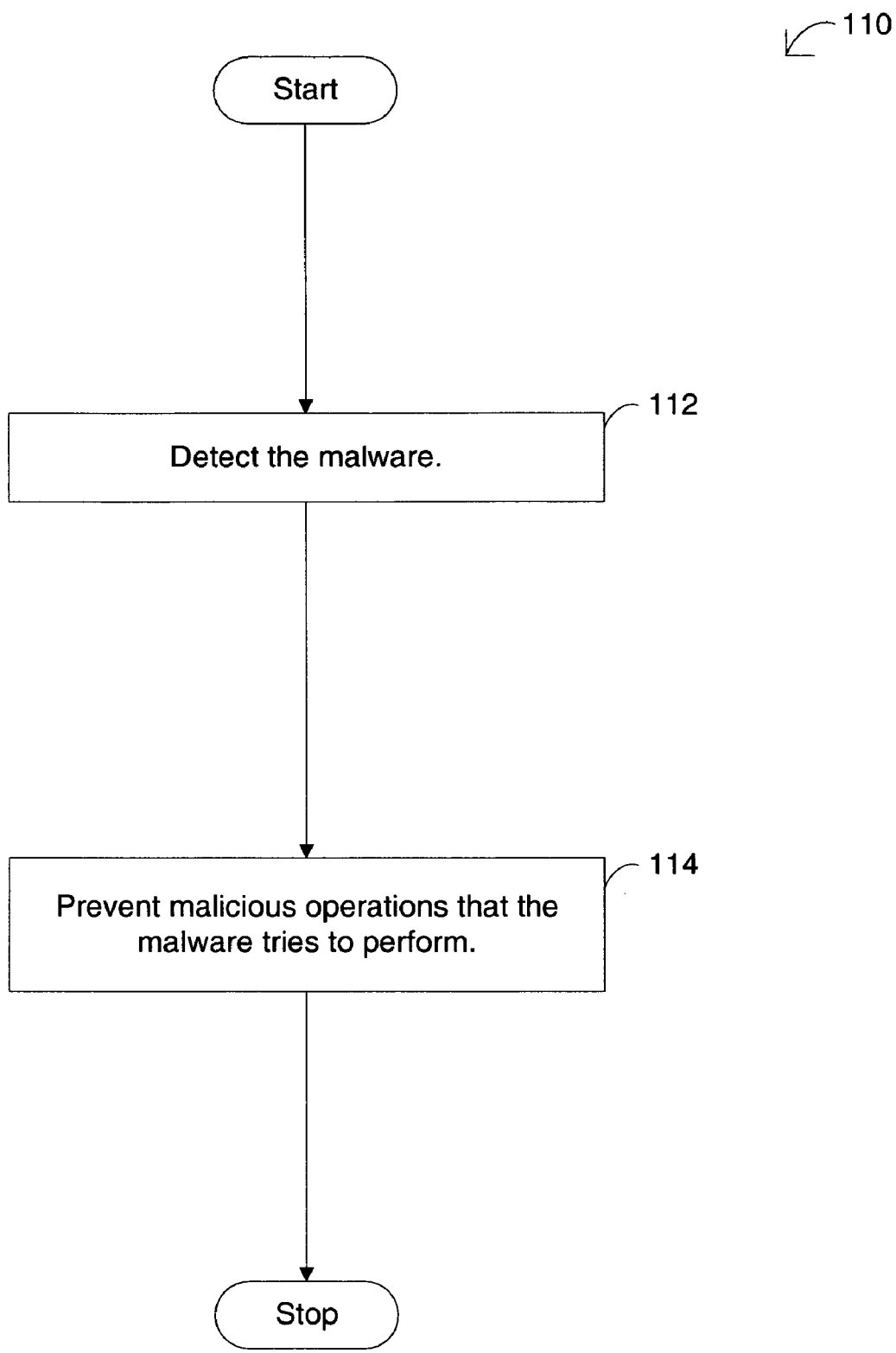
FIG. 1 is a flowchart of a prior art technique.
Figure 2:
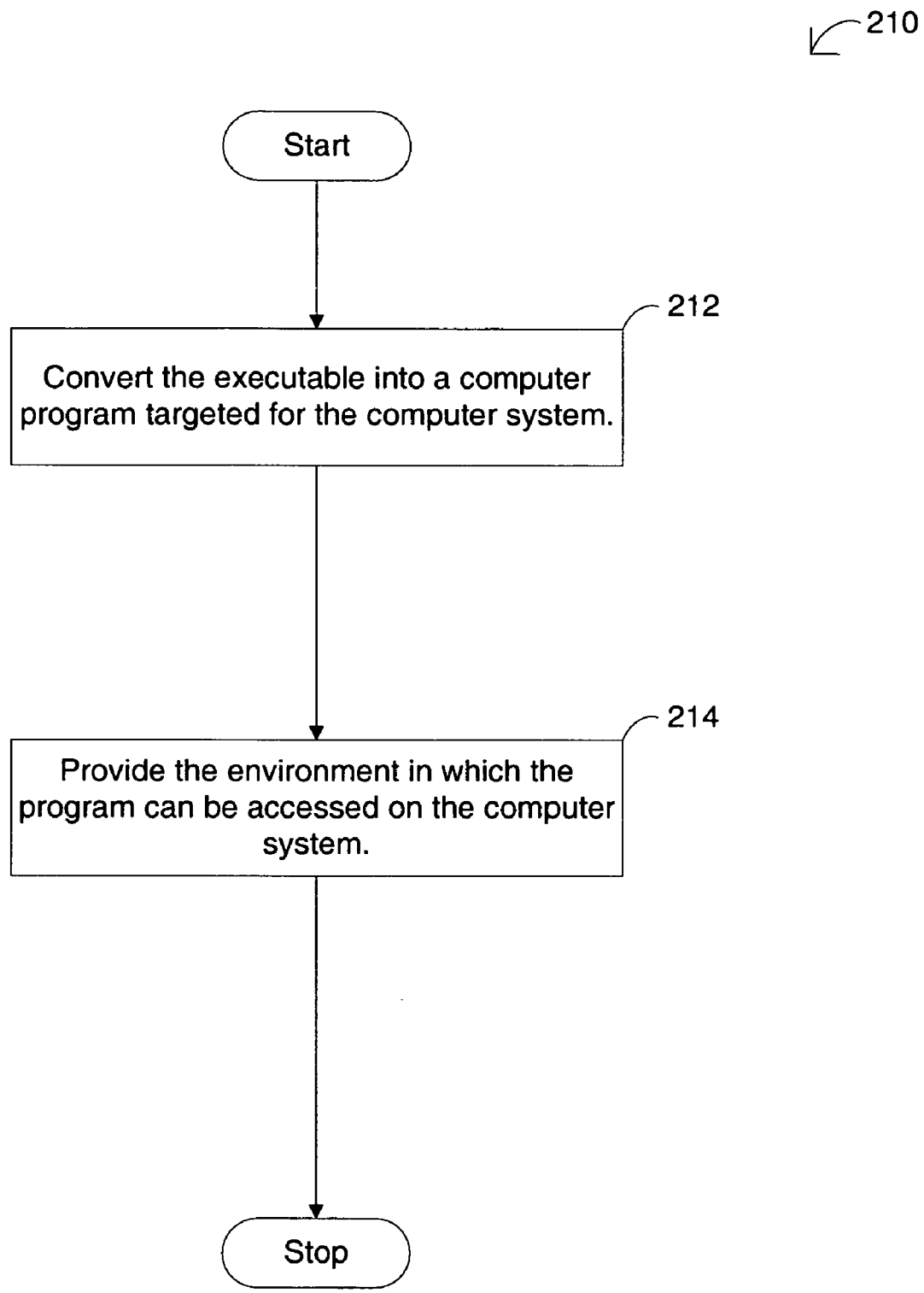
FIG. 2 is a flowchart in accordance with an exemplary embodiment of the present invention.

Referring to FIG. 2, in an exemplary embodiment, the present invention includes a step 212 of converting the executable into a computer program targeted for the computer system and a step 214 of providing the environment in which the program can be accessed on the computer system.

Converting the Executable

Scrambling the Executable

Figure 3A:
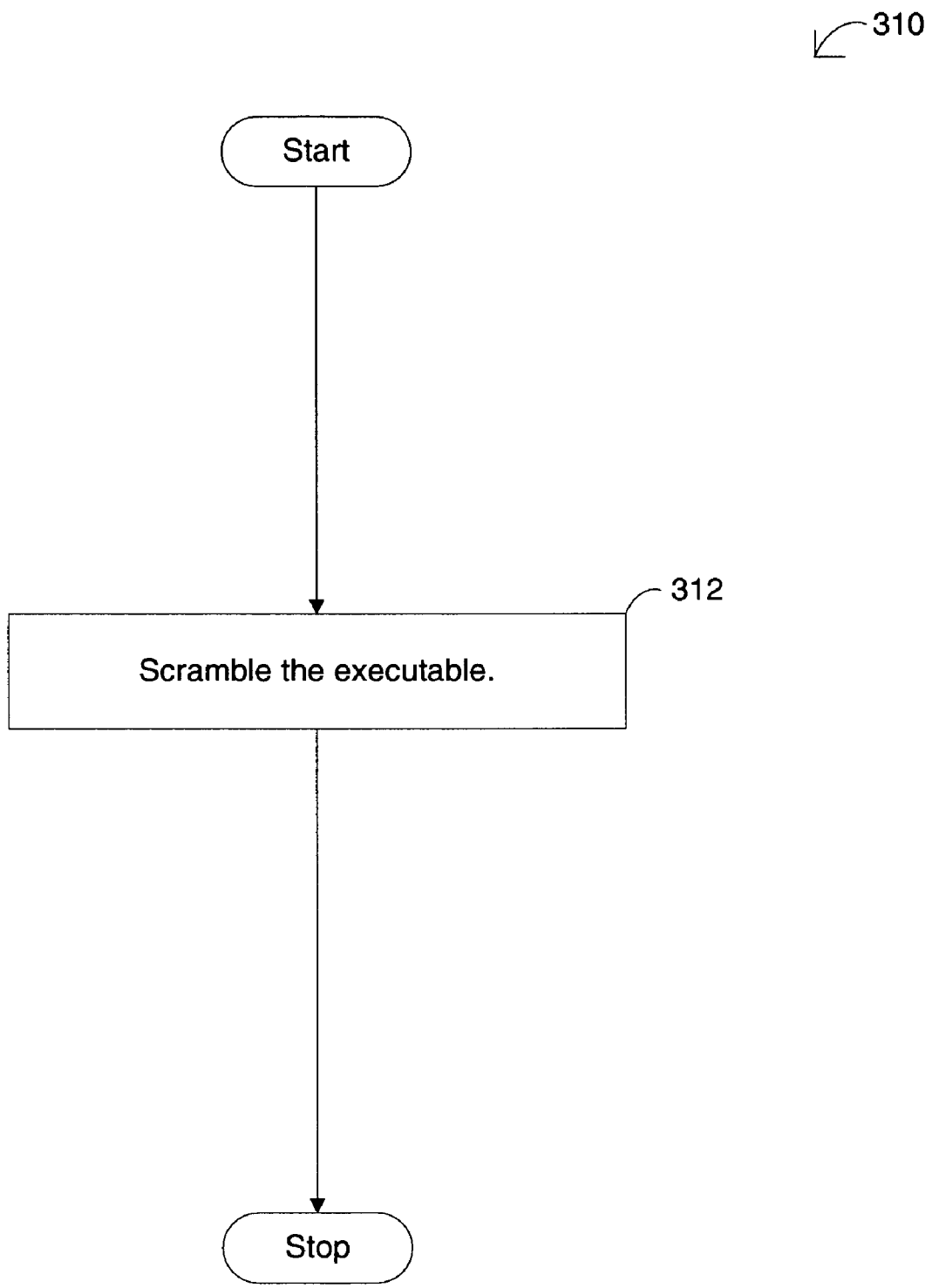
FIG. 3A is a flowchart of the converting step in accordance with an exemplary embodiment of the present invention.
Figure 3B:
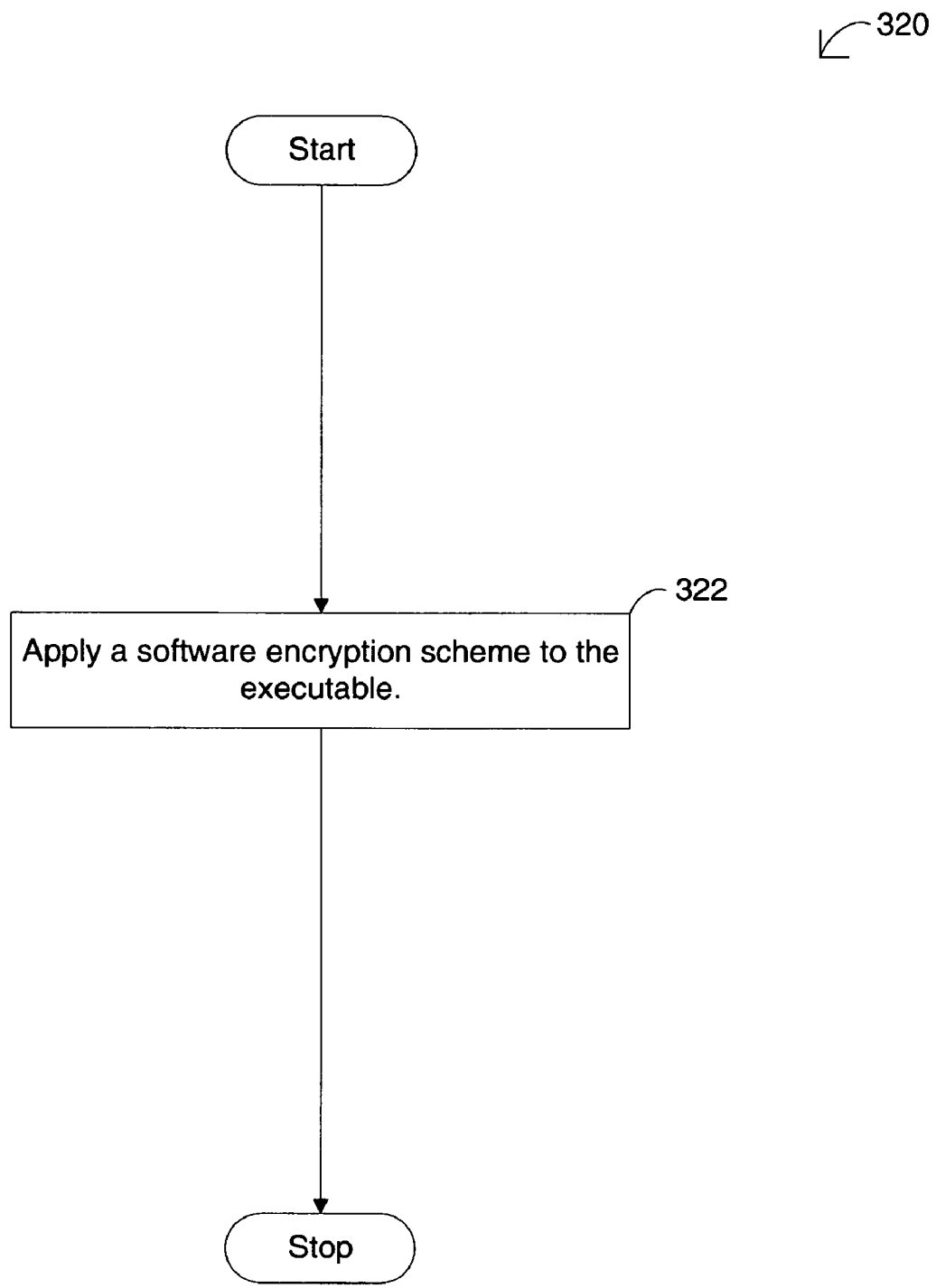
FIG. 3B is a flowchart of the scrambling step in accordance with a specific embodiment of the present invention.
Figure 3C:
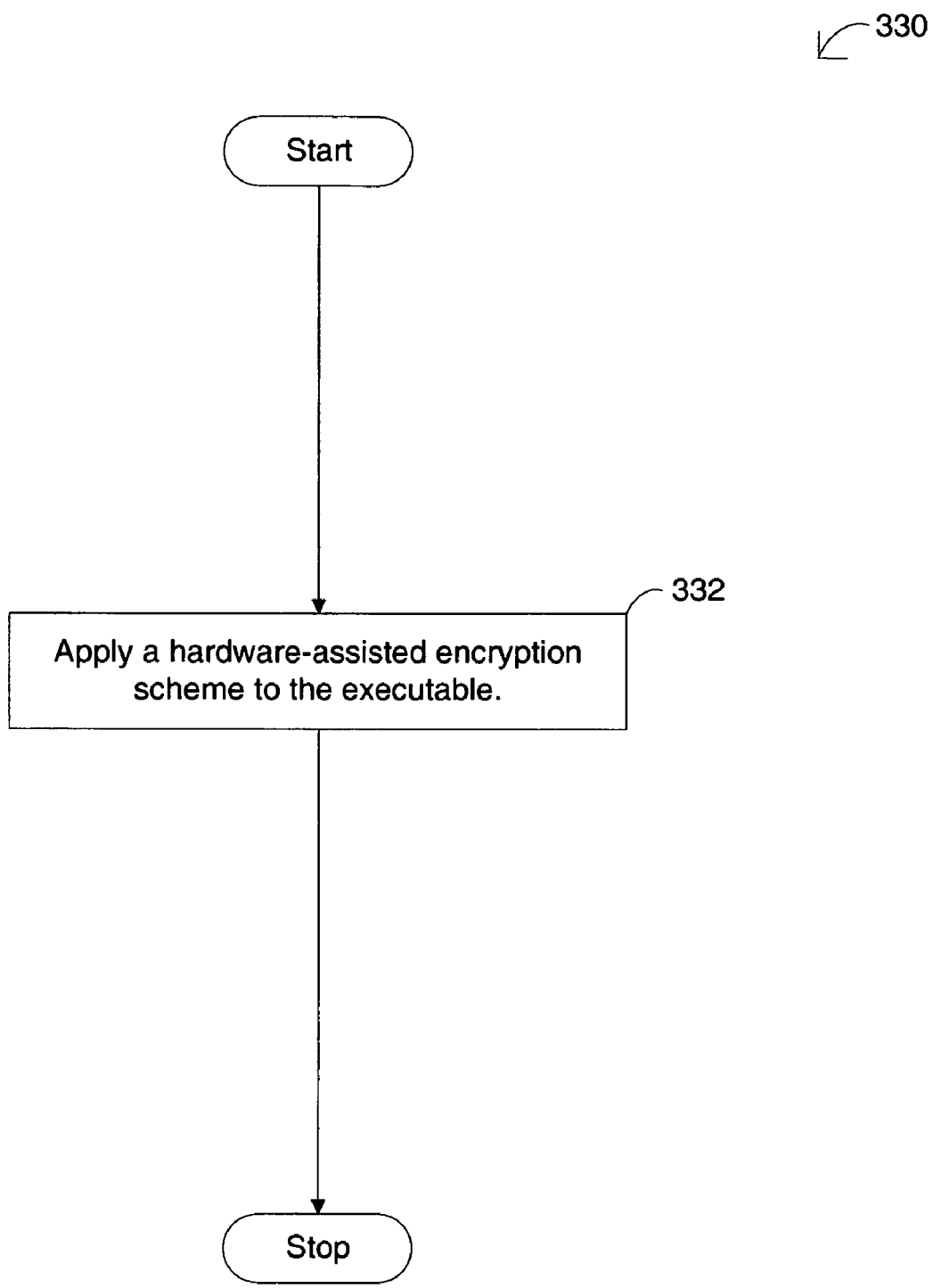
FIG. 3C is a flowchart of the scrambling step in accordance with a specific embodiment of the present invention.
Figure 3D:
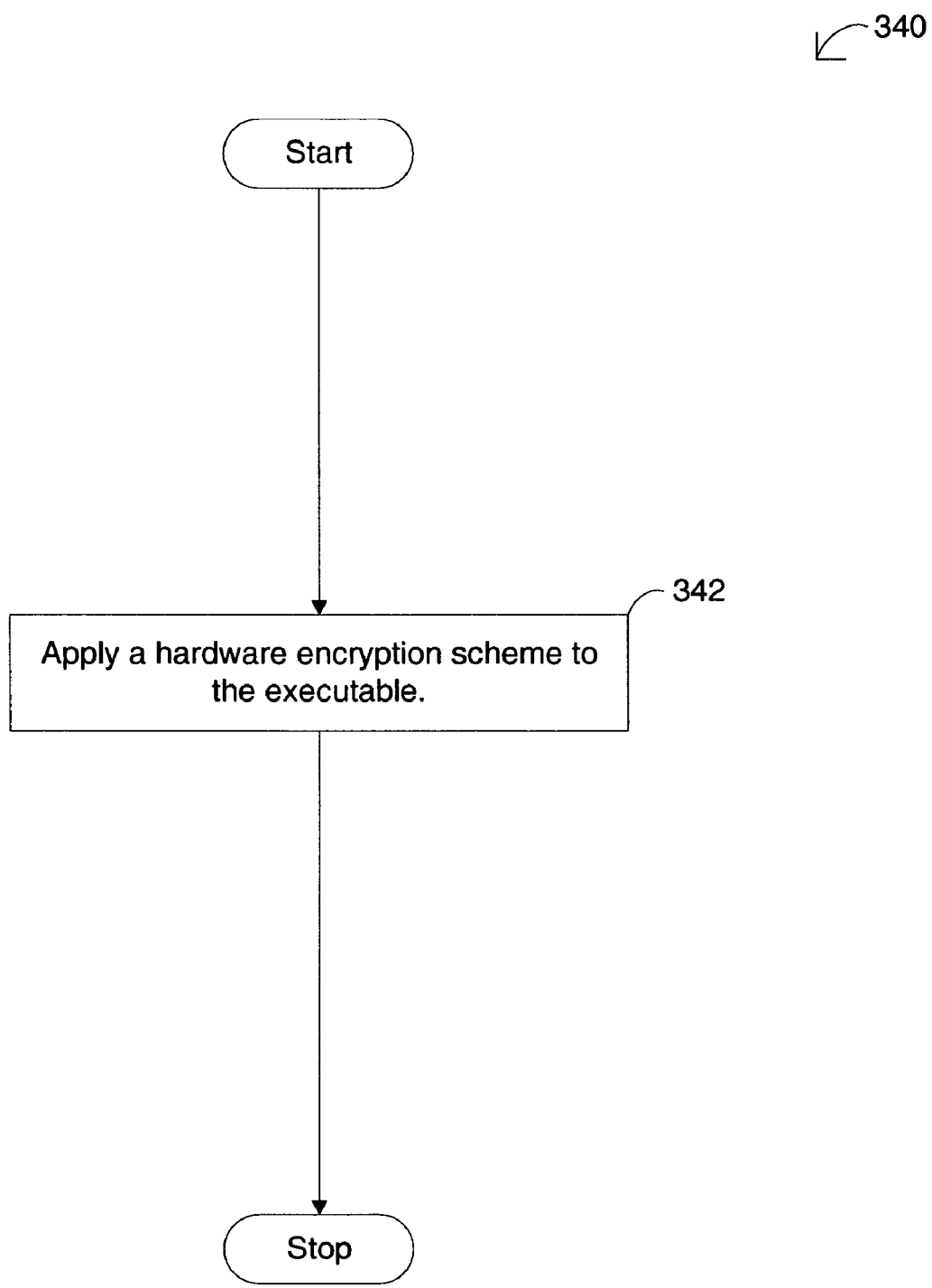
FIG. 3D is a flowchart of the scrambling step in accordance with a specific embodiment of the present invention.

Referring to FIG. 3A, in an exemplary embodiment, converting step 212 includes a step 312 of scrambling the executable. Referring next to FIG. 3B, in a specific embodiment, scrambling step 312 includes a step 322 of applying a software encryption scheme to the executable. Referring next to FIG. 3C, in a specific embodiment, scrambling step 312 includes a step 332 of applying a hardware-assisted encryption scheme to the executable. In a specific embodiment, the hardware-assisted encryption scheme includes IBM Corporation's (hereinafter "IBM") Trusted Platform Module (TPM) and a plugin-based "scrambling scheme". Referring next to FIG. 3D, in a specific embodiment, scrambling step 312 includes a step 342 of applying a hardware encryption scheme to the executable.

In an exemplary embodiment, scrambling step 312 divides the executable into sets of pages (with each page including 4096 bytes), with each set containing a variable number of pages. Scrambling step 312 then shuffles the sets, and optionally transcodes instructions in the sets, to yield a new file, an encrypted file. Scrambling step 312 then marks the encrypted file's executable header as invalid, thereby ensuring that if the shuffling yielded a runnable binary, the new file would not run on the computer system. In an exemplary embodiment, the resulting encrypted file is the computer program targeted for the computer system.

In an exemplary embodiment, scrambling step 312 uses a scrambling scheme that is efficient such that given any tuple (i.e., offset to read from, number of bytes to read), descrambling the program should neither have to process the entire program nor have to process all the data in the program preceding the "offset to read from" location in the program. In an exemplary embodiment, scrambling step 312 uses a scrambling scheme with properties dictated by the context of use of the AxE and a desired level of security.

Attaching Filesystem Metadata

Figure 4:
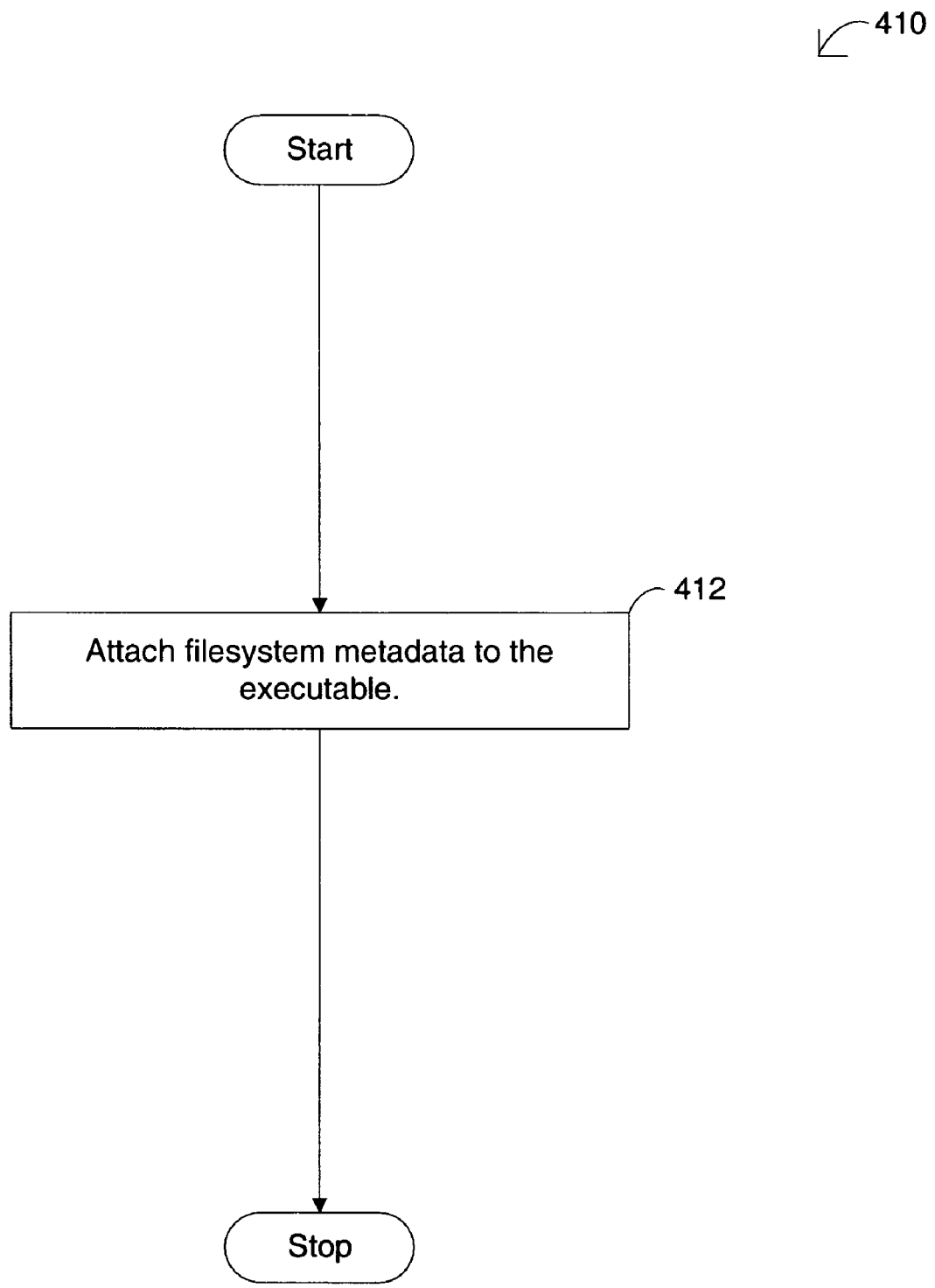
FIG. 4 is a flowchart of the converting step in accordance with an exemplary embodiment of the present invention.

Referring to FIG. 4, in an exemplary embodiment, converting step 212 includes a step 412 of attaching filesystem metadata to the executable. In an exemplary embodiment, the filesystem metadata is an alternate data stream of the executable. In an exemplary embodiment, attaching step 412 ties the metadata to the computer system using the IBM TPM. In an exemplary embodiment, attaching step 412 ties the metadata to the computer system using a software scrambling scheme. In a specific embodiment, the software scrambling scheme can be tied to the computer system by using a software construct, such as a logon token. In an exemplary embodiment, the metadata cannot be practically fabricated illegitimately because of the properties of the IBM TPM or the strength of the software scrambling scheme. In an exemplary embodiment, attaching step 412 stores an arbitrary strength signature of the file content of the executable in the metadata, in order to supplement the verification of the file content against offline modification.

Providing the Environment

Executing the Program

Figure 5A:
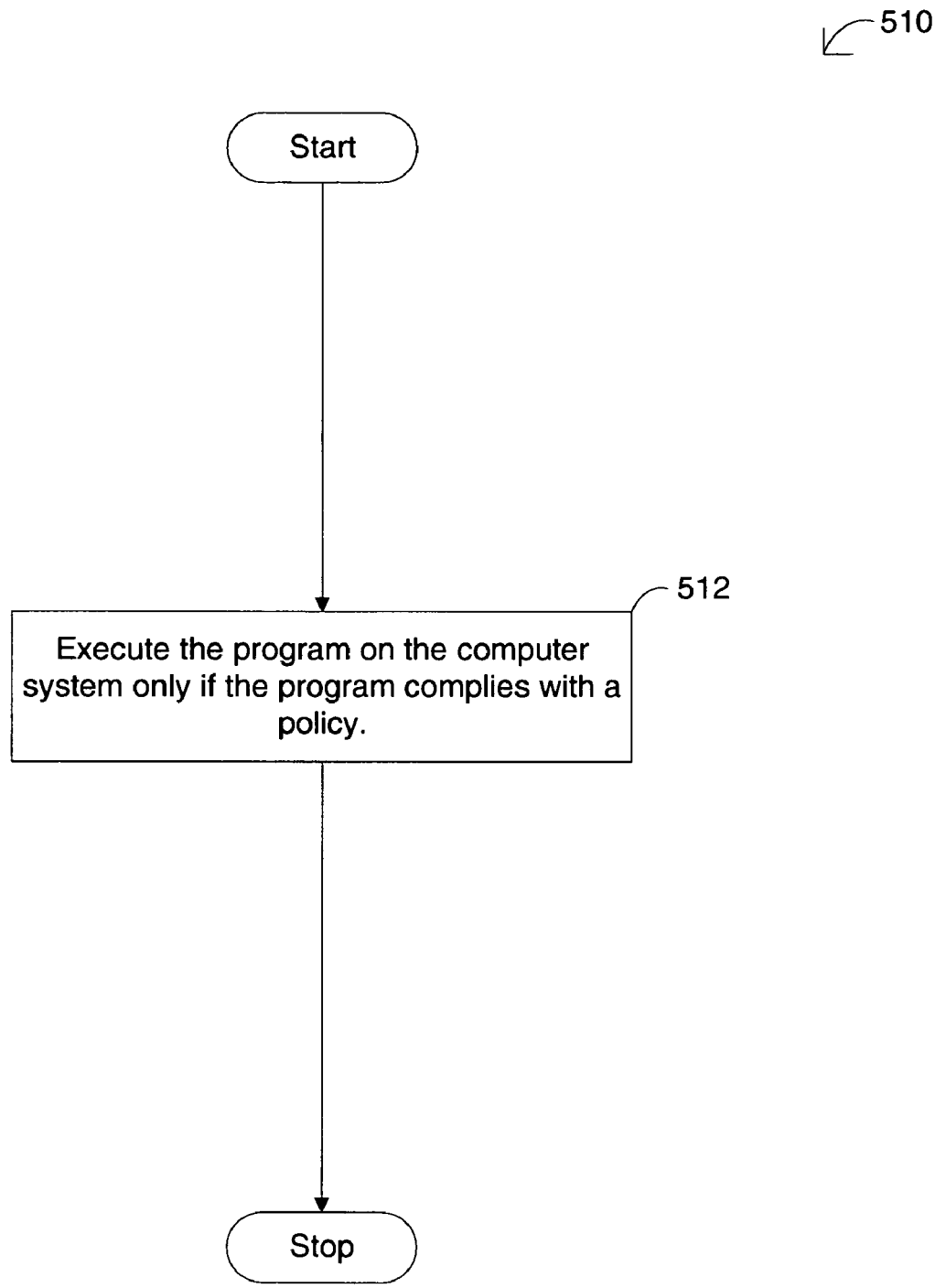
FIG. 5A is a flowchart of the providing step in accordance with an exemplary embodiment of the present invention.

Referring to FIG. 5A, in an exemplary embodiment, providing step 214 includes a step 512 of executing the program on the computer system only if the program complies with a policy. In an exemplary embodiment, the metadata in the program is used by the computer system in order to be able to execute the program on the computer system. As a result of protecting the metadata to the computer system by using the IBM TPM or the software scrambling scheme, the metadata can only be unwrapped on the computer system (i.e., the targeted computer system).

Scrambled Program with Metadata

Figure 5B:
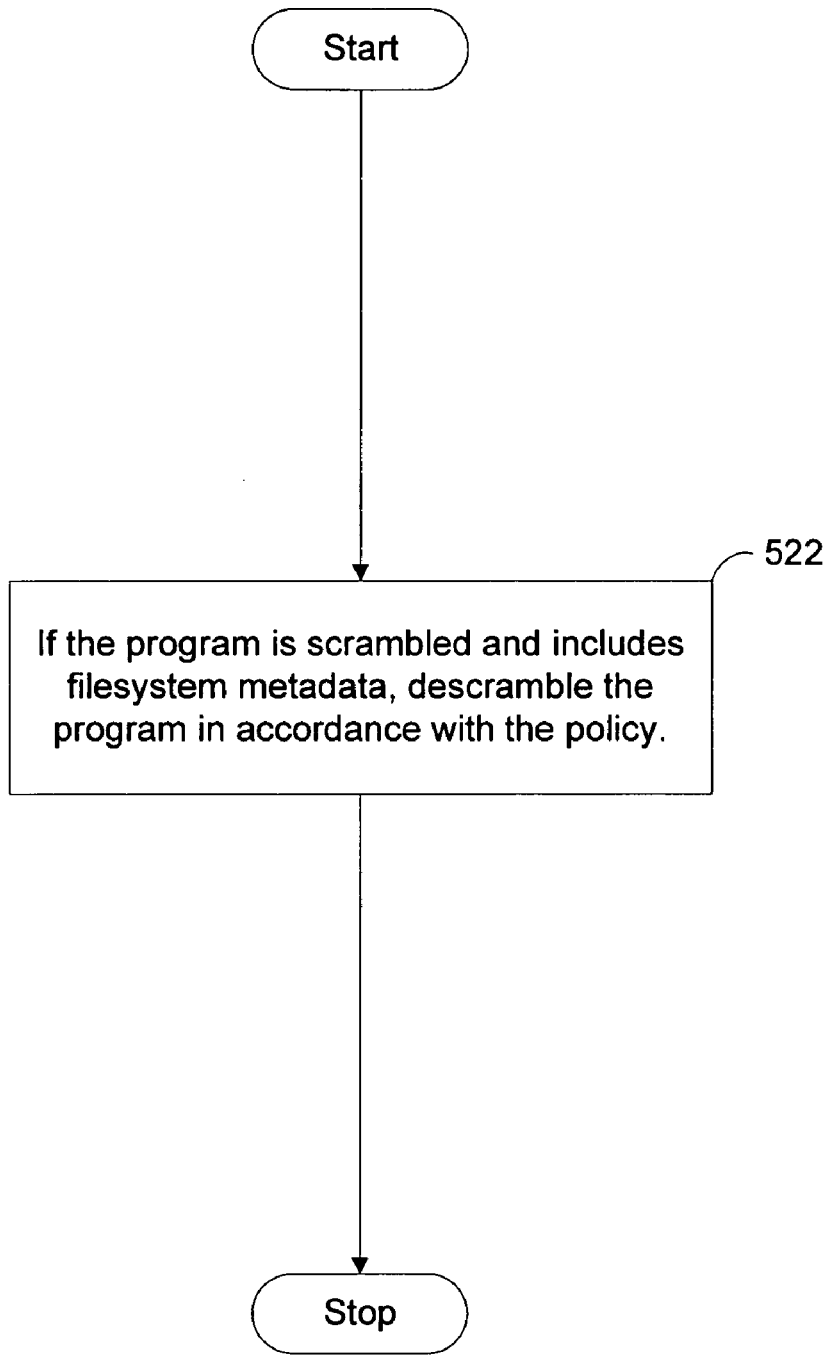
FIG. 5B is a flowchart of the executing step in accordance with an exemplary embodiment of the present invention.

Referring to FIG. 5B, in an exemplary embodiment, executing step 512 includes a step 522 of, if the program is scrambled and includes filesystem metadata, descrambling the program in accordance with the policy. In an exemplary embodiment, if the program is scrambled and includes filesystem metadata, the program is an Eaxe binary. An Eaxe binary is targeted towards a particular computer system or a particular set of computer systems. An Eaxe binary is targeted in this manner typically during the deployment of the Eaxe binary by information technology personnel. In an exemplary embodiment, an Eaxe binary is targeted by using IBM's TPM. As a result of this targeting, the Eaxe binary can run only on the targeted computer system or targeted set of computer systems.

Figure 5C:
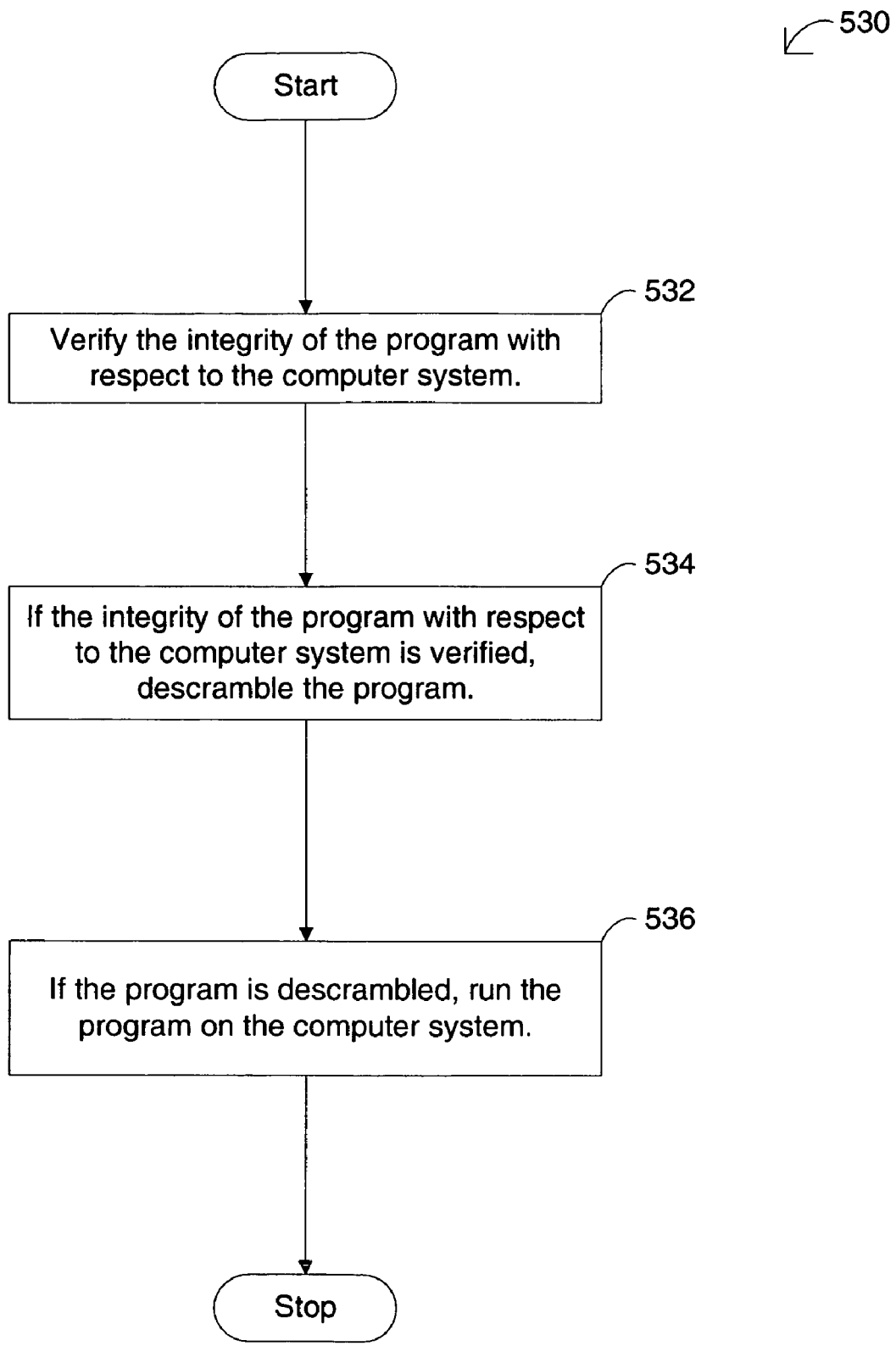
FIG. 5C is a flowchart of the descrambling step in accordance with a specific embodiment of the present invention.

Referring next to FIG. 5C, in a specific embodiment, descrambling step 522 includes a step 532 of verifying the integrity of the program with respect to the computer system, a step 534 of, if the integrity of the program with respect to the computer system is verified, descrambling the program, and a step 536 of, if the program is descrambled, running the program on the computer system.

Program with Metadata and that is Not Scrambled

Figure 5D:
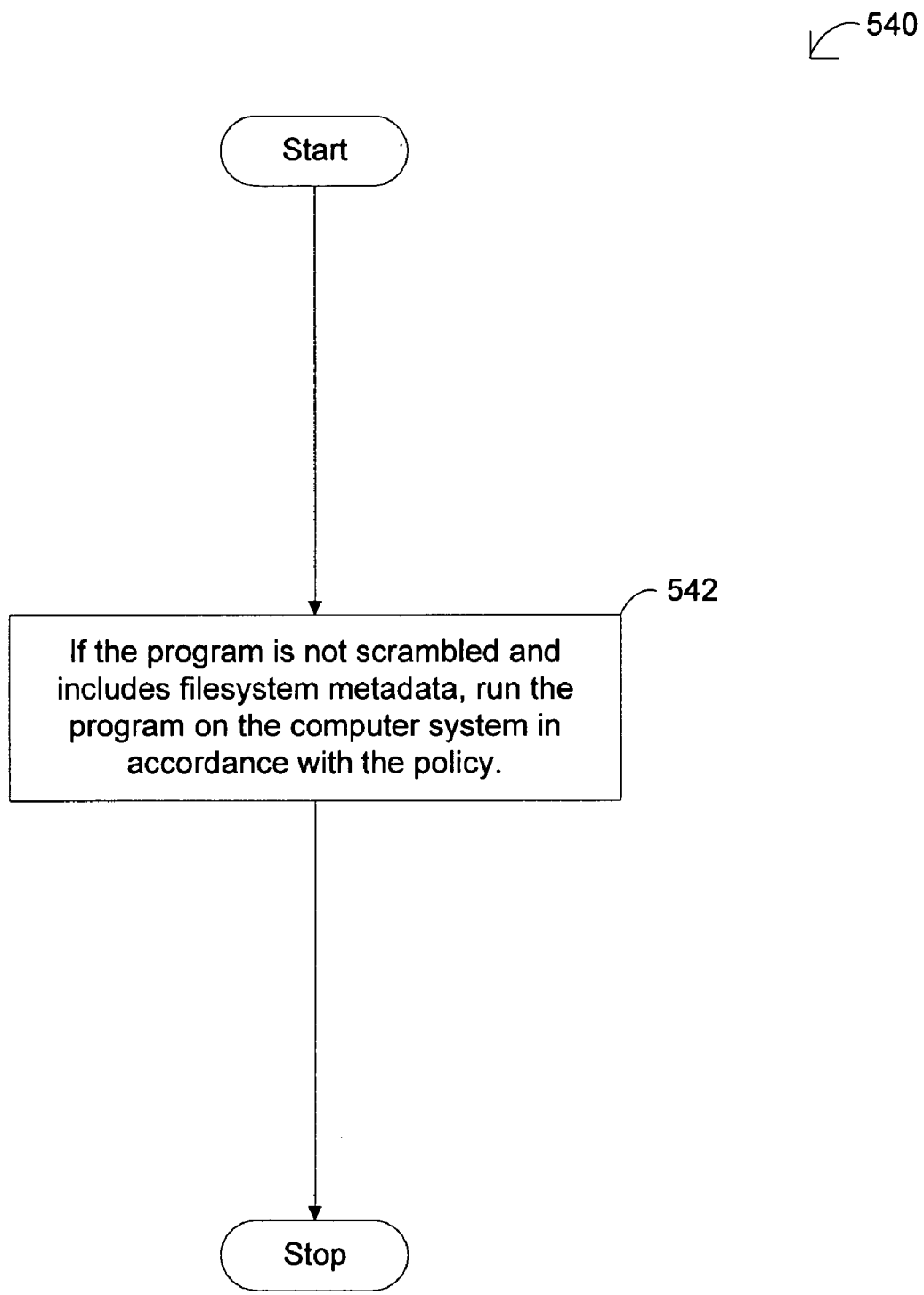
FIG. 5D is a flowchart of the executing step in accordance with an exemplary embodiment of the present invention.

Referring to FIG. 5D, in an exemplary embodiment, executing step 512 includes a step 542 of, if the program is not scrambled and includes filesystem metadata, running the program on the computer system in accordance with the policy. In an exemplary embodiment, if the program is not scrambled and includes filesystem metadata, the program is an Ebase binary. An Ebase binary represents a safe, "known to be good" starting point program. For example, the AxE runtime program is an Ebase binary.

Program without Metadata and that is Not Scrambled

Figure 5E:
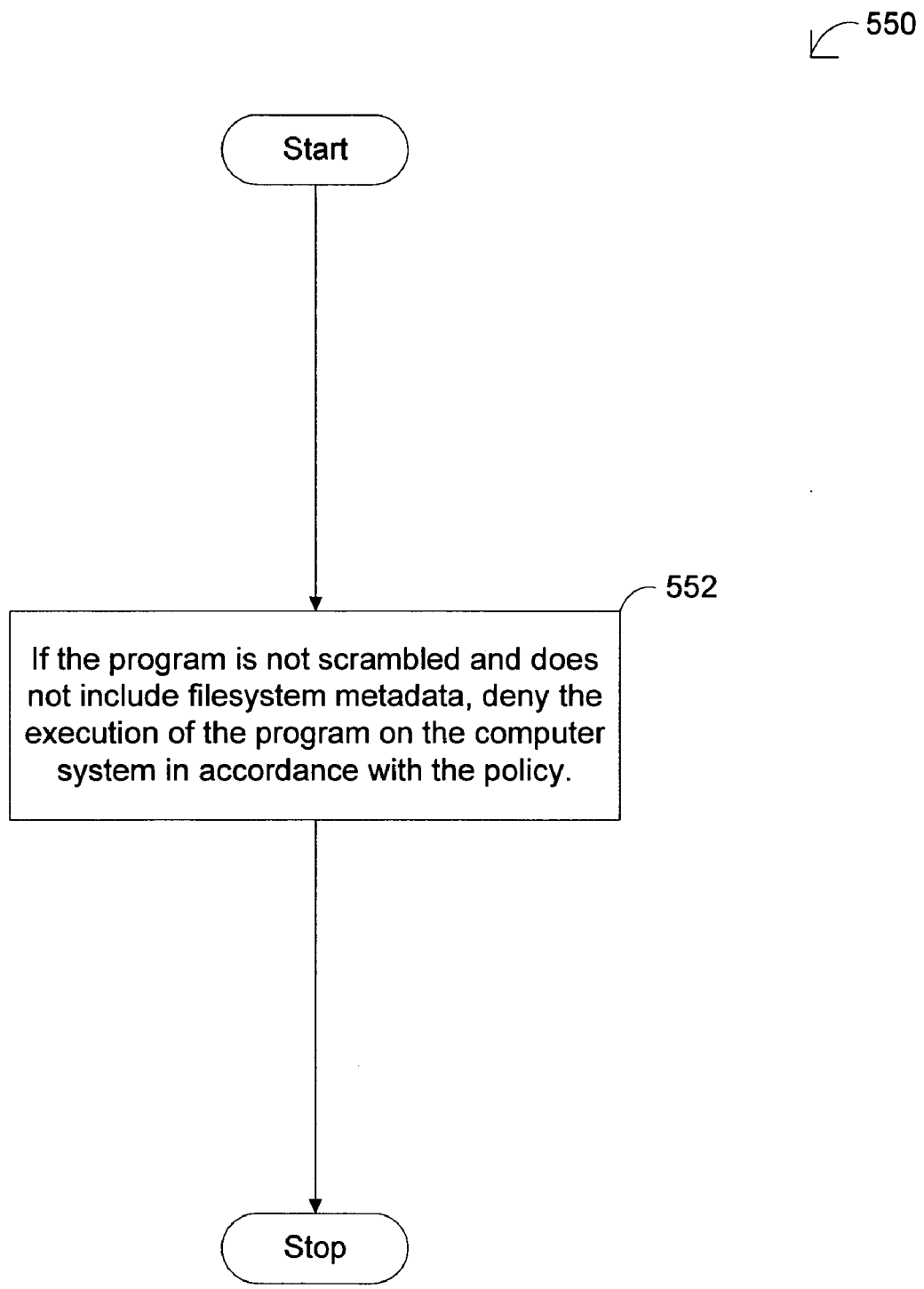
FIG. 5E is a flowchart of the executing step in accordance with an exemplary embodiment of the present invention.

Referring to FIG. 5E, in an exemplary embodiment, executing step 512 includes a step 552 of, if the program is not scrambled and does not include filesystem metadata, denying the execution of the program on the computer system in accordance with the policy. In an exemplary embodiment, if the program is not scrambled and does not include filesystem metadata, the program is an Erandom binary. An Erandom binary is a program that has neither been explicitly deployed (i.e., an Eaxe binary) nor is an Ebase binary. In an exemplary embodiment, an Erandom binary may be subject to one of the following policies:

1. Will always be ALLOWED to run;
2. Will always be DISALLOWED to run;
3. Will always PROMPT the user for a Boolean response (RUN, DO NOT RUN), giving as much detail as possible about the Erandom binary; or
4. Will always be allowed to run in a "sandbox" of the computer system, such as the least privileged environment provided by Windows.

By default, in an exemplary embodiment, Erandom binaries are not allowed to execute on the computer system. In an exemplary embodiment, statistics of the prompts are maintained.

Preventing Malicious Code

Figure 6A:
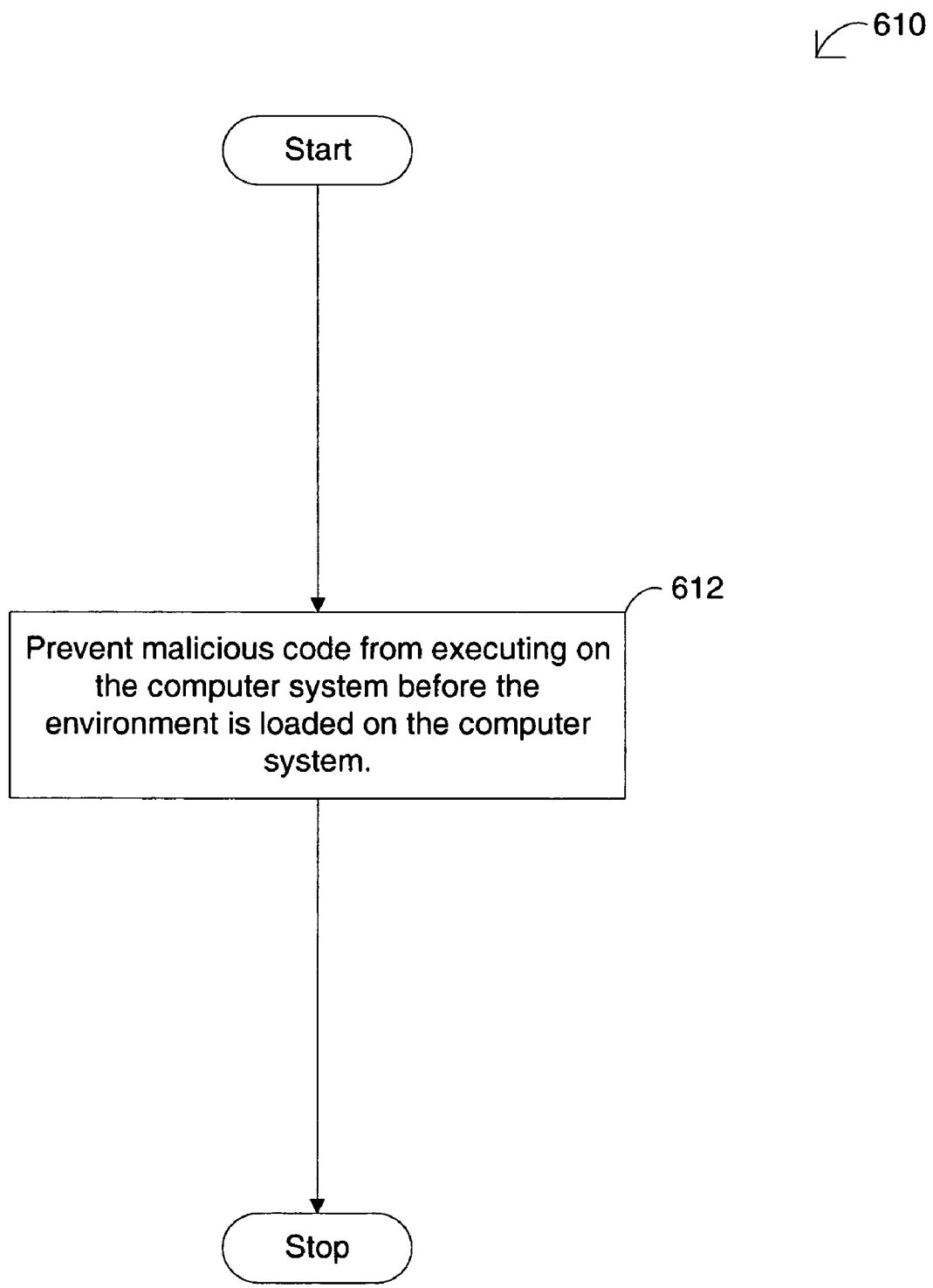
FIG. 6A is a flowchart of the providing step in accordance with an exemplary embodiment of the present invention.

Referring to FIG. 6A, in an exemplary embodiment, providing step 214 includes a step 612 of preventing malicious code from executing on the computer system before the environment is loaded on the computer system. In an exemplary embodiment, preventing step 612 prevents either an Eaxe binary or an Ebase binary from being modified on a computer system that is running the assured execution environment (AXE). In an exemplary embodiment, such protection from modification is implemented in a platform-dependent manner. Thus, the sanctity of Eaxe binaries and Ebase binaries could be proactively maintained.

Figure 6B:
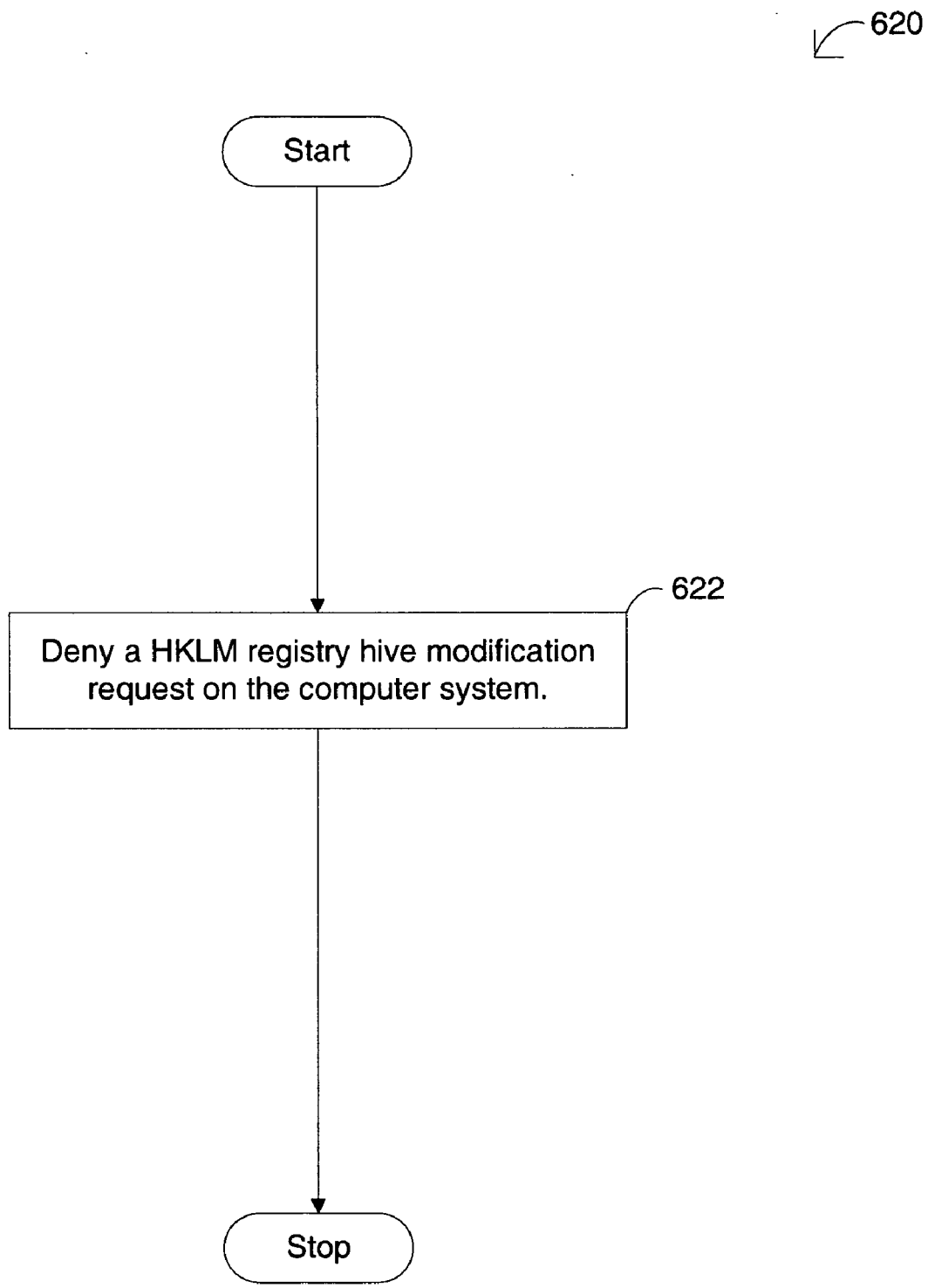
FIG. 6B is a flowchart of the preventing step in accordance with a specific embodiment of the present invention.
Figure 6C:
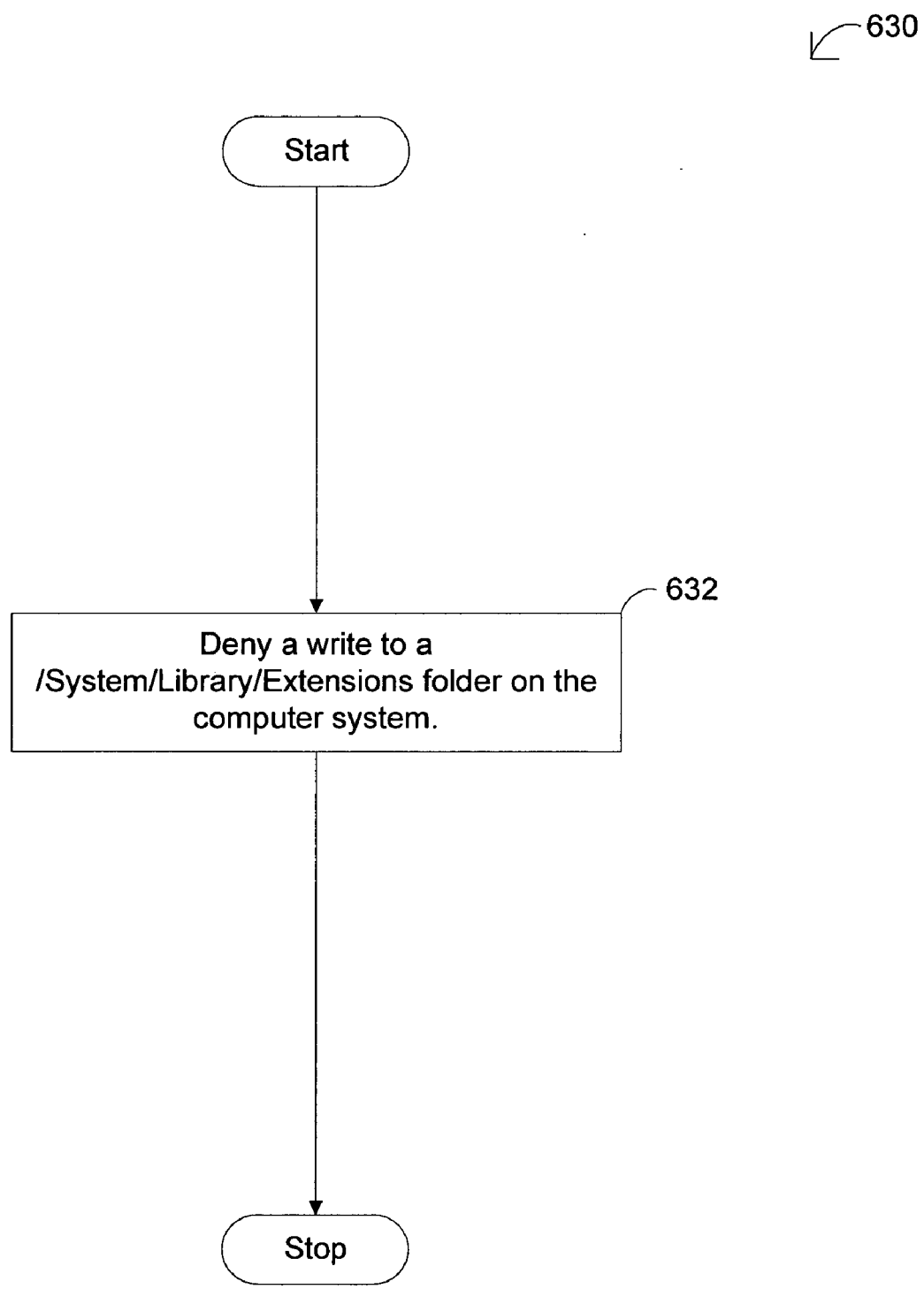
FIG. 6C is a flowchart of the preventing step in accordance with a specific embodiment of the present invention.

Referring next to FIG. 6B, in a specific embodiment, preventing step 612 includes a step 622 of denying a HKLM registry hive modification request on the computer system. Thus, on a computer system running Microsoft Corporation's (hereinafter "Microsoft") Microsoft Windows (hereinafter "Windows") operating system, the protection against the modification of either an Eaxe binary or an Ebase binary includes denying modification attempts by boot-time drivers. Referring next to FIG. 6C, in a specific embodiment, preventing step 612 includes a step 632 of denying a write to a /System/Library/Extensions folder on the computer system. Thus, on a computer system running Apple Computer, Inc.'s (hereinafter "Apple") Mac OS X operating system, the protection against the modification of either an Eaxe binary or an Ebase binary includes denying modification attempts by boot-time drivers.

Reading the Program

Figure 7:
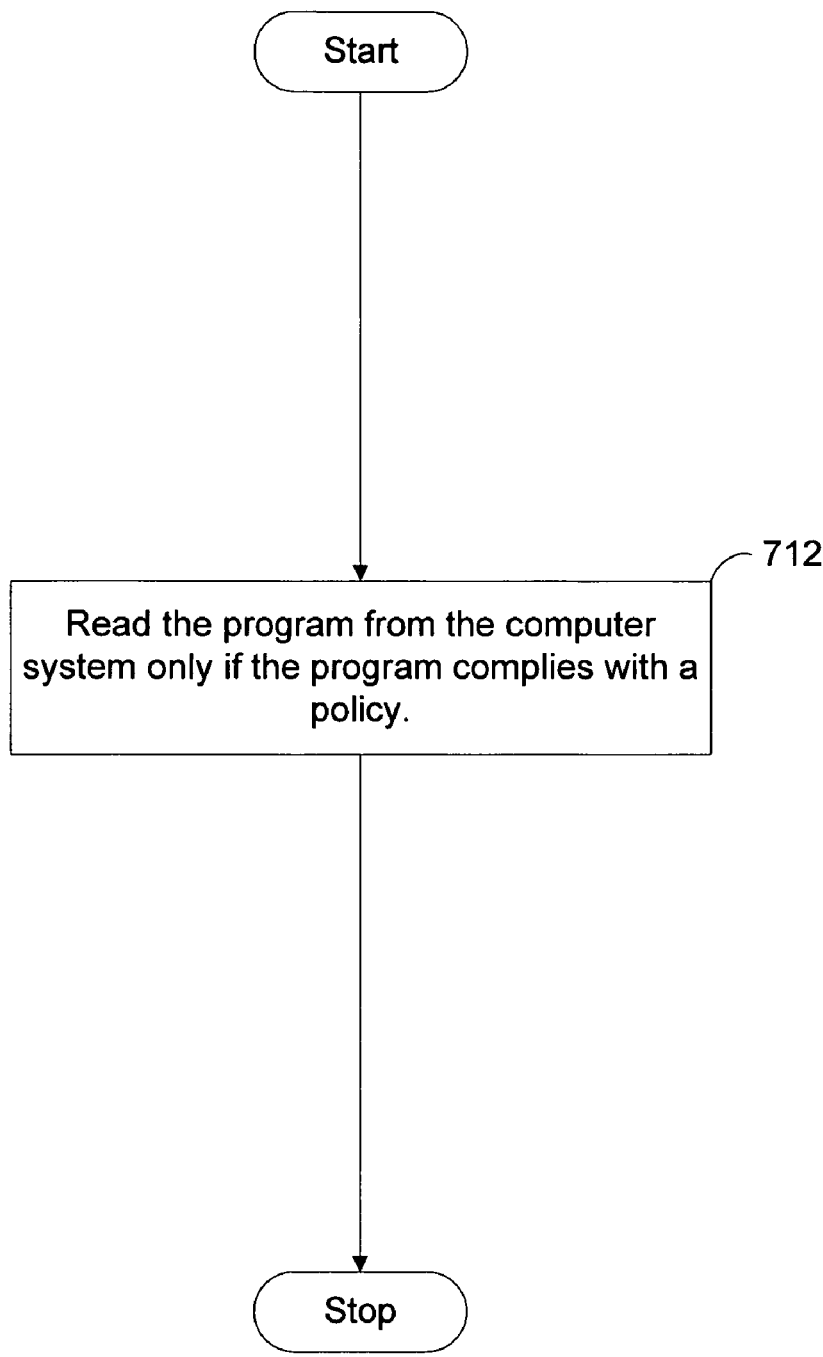
FIG. 7 is a flowchart of the providing step in accordance with an exemplary embodiment of the present invention.

Referring to FIG. 7, in an exemplary embodiment, providing step 214 includes a step 712 of reading the program from the computer system only if the program complies with a policy. In an exemplary embodiment, reading step 712 includes, if the program is scrambled and includes filesystem metadata, returning scrambled data. In an exemplary embodiment, reading step 712 includes, if the program is not scrambled, returning the actual data in the program.

Writing to the Program

Figure 8:
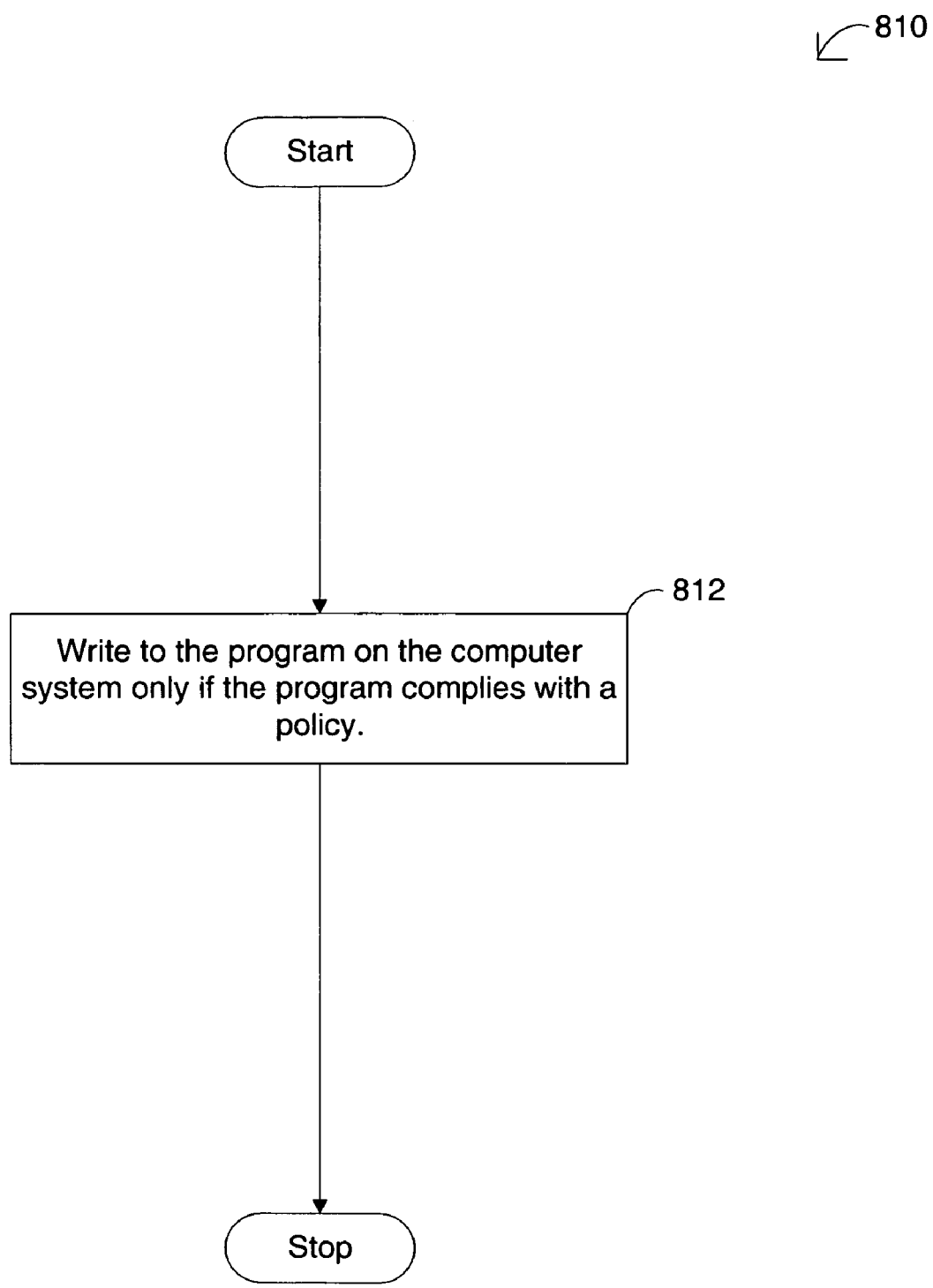
FIG. 8 is a flowchart of the providing step in accordance with an exemplary embodiment of the present invention.

Referring to FIG. 8, in an exemplary embodiment, providing step 214 includes a step 812 of writing to the program on the computer system only if the program complies with a policy. In an exemplary embodiment, writing step 812 includes, if the program includes filesystem metadata, denying a write request to the program. In an exemplary embodiment, writing step 812 includes, if the program does not include filesystem metadata, allowing the write request to the program.

Computer System

An exemplary computer system for practicing the embodiments of the present invention includes at least one processor or central processing unit (CPU), where the CPU(s) are interconnected via a system bus to various devices such as a random access memory (RAM), a read-only memory (ROM), and an input/output (I/O) adapter. The I/O adapter can connect to peripheral devices, such as disk units and tape drives, or other program storage devices that are readable by the system. The system can read instructions on the program storage devices and follow these instructions to execute the embodiments of the invention. In further embodiment, the system further includes a user interface adapter that can connect a keyboard, a mouse, a speaker, a microphone, and/or other user interface devices (e.g., a touch screen device) to the bus in order to gather user input. In a further embodiment, the system further includes a communication adapter that connects the bus to a data processing network. In a further embodiment, the system includes a display adapter that connects the bus to a display device which may be embodied as an output device (e.g., a monitor, printer, or transmitter).

CONCLUSION

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method, comprising:
converting at least one computer program executable into a computer program targeted for a computer system, wherein the converting comprises scrambling the at least one computer program executable by applying an encryption scheme to the at least one computer program executable;
providing an assured execution environment in which the computer program can be accessed on the computer system, wherein the providing comprises preventing malicious code from executing on the computer system before the environment is loaded on the computer system; and
executing the computer program on the computer system only if the computer program complies with a policy, wherein if the computer program does not include metadata from a filesystem of the computer system, denying the execution of the program in accordance with the policy.

2. The method of claim 1 wherein the scrambling comprises applying a software encryption scheme to the executable.

3. The method of claim 1 wherein the scrambling comprises applying a hardware-assisted encryption scheme to the executable.

4. The method of claim 1 wherein the scrambling comprises applying a hardware encryption scheme to the executable.

5. The method of claim 1 wherein the executing comprises, if the program includes metadata from the filesystem of the computer system, descrambling the program in accordance with the policy.

6. The method of claim 5 wherein the descrambling comprises:
verifying the integrity of the program with respect to the computer system; and
if the integrity of the program with respect to the computer system is verified, descrambling the program and running the program on the computer system.

7. The method of claim 1, wherein the preventing comprises denying a HKLM registry hive modification request on the computer system.

8. The method of claim 1, wherein the preventing comprises denying a write to /System/Library/Extensions folder on the computer system.

9. A system, comprising:
a converting module configured to convert at least one computer program executable into a computer program targeted for a computer system, wherein the converting module comprises a scrambling module configured to scramble the at least one computer program executable by applying an encryption scheme to the at least one computer program executable;
a providing module configured to provide an assured execution environment in which the computer program can be accessed on the computer system, wherein the providing module comprises a preventing module that prevents malicious code from executing on the computer system before the environment is loaded on the computer system; and
an executing module configured to execute the computer program on the computer system only if computer the program complies with a policy, wherein if the computer program does not include metadata from a filesystem of the computer system, the executing module denies the execution of the program in accordance with the policy.

10. The system of claim 9 wherein the scrambling module comprises an applying module configured to apply a software encryption scheme to the executable.

11. The system of claim 9 wherein the scrambling module comprises an applying module configured to apply a hardware-assisted encryption scheme to the executable.

12. The system of claim 9 wherein the scrambling module comprises an applying module configured to apply a hardware encryption scheme to the executable.

13. The system of claim 9 wherein the executing module comprises a descrambling module configured to descramble, if the program includes metadata from the filesystem of the computer system, the program in accordance with the policy.

14. The system of claim 13 wherein the descrambling module comprises:
a verifying module configured to verify the integrity of the program with respect to the computer system; and
a running module configured to run, if the program is descrambled, the program on the computer system; and
wherein the descrambling module is configured to descramble, if the integrity of the program with respect to the computer system is verified, the program.

15. The system of claim 9, wherein the preventing module denies a HKLM registry hive modification request on the computer system.

16. The method of claim 9, wherein the preventing module denies a write to /System/Library/Extensions folder on the computer system.

17. A computer program product, the computer program product comprising a computer readable storage medium having computer readable program code embodied therewith, the computer readable program code comprising:
computer readable code for converting at least one computer program executable into a computer program targeted for a computer system, wherein converting comprises scrambles the at least one computer program executable by applying an encryption scheme to the at least one computer program executable;
computer readable code for providing an assured execution environment in which the computer program can be accessed on the computer system, wherein the providing prevents malicious code from executing on the computer system before the environment is loaded on the computer system; and
computer readable code for executing the computer program on the computer system only if the computer program complies with a policy, wherein if the computer program does not include metadata from a filesystem of the computer system, denying the execution of the program in accordance with the policy.

18. The computer program product of claim 17 wherein the computer readable code for scrambling comprises computer readable code for applying a software encryption scheme to the executable.

19. The computer program product of claim 17 wherein the computer readable code for scrambling comprises computer readable code for applying a hardware-assisted encryption scheme to the executable.

20. The computer program product of claim 17 wherein the computer readable code for scrambling comprises computer readable code for applying a hardware encryption scheme to the executable.

21. The computer program product of claim 17 wherein the computer readable code for executing comprises computer readable code for descrambling, if the program includes metadata from the filesystem of the computer system, the program in accordance with the policy.

22. The computer program product of claim 21 wherein the computer readable code for descrambling comprises:
   computer readable code for verifying the integrity of the program with respect to the computer system;
   computer readable code for running, if the program is descrambled, the program on the computer system; and
   wherein the computer readable code descrambles the program, if the integrity of the program with respect to the computer system is verified.

23. The computer program product of claim 17, wherein the computer readable code for providing the assured execution environment denies a HKLM registry hive modification request on the computer system.

24. The computer program product of claim 17, wherein the computer readable code for providing the assured execution environment denies a write to /System/Library/Extensions folder on the computer system.

* * * * *